United States Patent
Hawtof (10) Patent No.: US 10,570,048 B2
(45) Date of Patent: Feb. 25, 2020

(54) SILICA-CONTAINING SHEET AND RELATED SYSTEM AND METHODS

(71) Applicant: Corning Incorporated, Corning, NY (US)

(72) Inventor: Daniel Warren Hawtof, Corning, NY (US)

(73) Assignee: Corning Incorporated, Corning, NY (US)

( * ) Notice: Subject to any disclaimer, the term of this patent is extended or adjusted under 35 U.S.C. 154(b) by 904 days.

(21) Appl. No.: 14/621,881

(22) Filed: Feb. 13, 2015

(65) Prior Publication Data
US 2016/0236961 A1 Aug. 18, 2016

(51) Int. Cl.
*C03B 19/14* (2006.01)

(52) U.S. Cl.
CPC ...... *C03B 19/1423* (2013.01); *C03B 19/1453* (2013.01); *C03B 2207/64* (2013.01); *C03B 2207/66* (2013.01)

(58) Field of Classification Search
CPC .... B32B 3/10; B32B 3/14; B32B 3/18; B32B 3/263; B32B 5/142; B32B 5/145; B32B 5/16; B32B 5/22; B32B 5/30; B32B 17/06; Y10T 428/24355; Y10T 428/24372; Y10T 428/2438; Y10T 428/24421; Y10T 428/24479; Y10T 428/24521; Y10T 428/24612; Y10T 428/2462; Y10T 428/24802; Y10T 428/24851; Y10T 428/24893; Y10T 428/24926; Y10T 428/2495
(Continued)

(56) References Cited

U.S. PATENT DOCUMENTS

| | | | | |
|---|---|---|---|---|
| 4,494,968 A | * | 1/1985 | Bhagavatula | ........... C03B 19/14 385/126 |
| 6,606,883 B2 | | 8/2003 | Hrdina et al. | |

(Continued)

FOREIGN PATENT DOCUMENTS

| | | |
|---|---|---|
| JP | 59092923 A | 5/1984 |
| JP | 9-286621 A | 11/1997 |

OTHER PUBLICATIONS

Hawtof et al; "High Silica Content Substrate Such as for Use in Thin-Film Battery"; U.S. Appl. No. 14/684,627, filed Apr. 13, 2015.
(Continued)

*Primary Examiner* — Megha M Gaitonde
(74) *Attorney, Agent, or Firm* — Russell S. Magaziner (57) ABSTRACT

A system and process for making a thin, soot particle or glass sheet is provided. The system includes a soot deposition plate having a deposition surface and a glass soot generating device spaced from the deposition surface along a first axis. The glass soot generating device is configured to generate glass soot particles and to deliver the glass soot particles through an outlet and on to the deposition surface in a layer having a thickness of less than 5 mm. At least one of the soot deposition plate and the glass soot generating device is movable to cause relative movement between the deposition surface of the soot deposition plate and the glass soot generating device. A thin soot or sintered soot sheet is also provided. The soot sheet has a variable surface topography that varies along at least two axes.

9 Claims, 6 Drawing Sheets

(58) Field of Classification Search
USPC ....... 428/141, 143, 144, 145, 149, 156, 161, 428/168, 172, 173, 195.1, 201, 204, 206, 428/210, 212, 213
See application file for complete search history.

(56) References Cited

U.S. PATENT DOCUMENTS

| | | | |
|---|---|---|---|
| 6,693,248 | B1 | 2/2004 | Schultz |
| 7,677,058 | B2 | 3/2010 | Hawtof et al. |
| 8,062,733 | B2 | 11/2011 | Hawtof et al. |
| 8,181,485 | B2 | 5/2012 | Coffey et al. |
| 8,359,884 | B2 | 1/2013 | Hawtof |
| 8,438,876 | B2 | 5/2013 | Noni, Jr. |
| 8,746,013 | B2 | 6/2014 | Geremew et al. |
| 8,857,216 | B2 | 10/2014 | Geremew et al. |
| 9,422,187 | B1 | 8/2016 | Bankaitis et al. |
| 2007/0130995 | A1 | 6/2007 | Hawtof et al. |
| 2010/0291346 | A1* | 11/2010 | Hawtof ............... C03B 19/1407 428/141 |
| 2013/0052413 | A1 | 2/2013 | Hawtof |
| 2013/0316136 | A1 | 11/2013 | Hawtof et al. |
| 2015/0111007 | A1 | 4/2015 | Hawtof et al. |

OTHER PUBLICATIONS

Lal et al; "Substrate Including Silica"; U.S. Appl. No. 15/057,601, filed Mar. 1, 2016.
Li et al; "Additive Manufacturing Processes and Manufactured Article"; U.S. Appl. No. 62/204,627, filed Aug. 13, 2015.
Hawtof et al; "Method of Forming Light Emitting Diode With High-Silica Substrate"; U.S. Appl. No. 62/279,269, filed Jan. 15, 2016.
Hawtof et al; "High Silica Content Substrate Such as for Use Harsh Environment Circuits and High Frequency Antennas"; U.S. Appl. No. 62/287,645, filed Jan. 27, 2016.
Hawtof et al; "Laser Sintering System and Method for Forming High Purity, Low Roughness, Low Warp Silica Glass"; U.S. Appl. No. 62/312,730, filed Mar. 24, 2016.
International Search Report and Written Opinion PCT/US2016/017231 dated Jul. 1, 2016.
Lal et al.; "Substrate Such as for Use With Carbon Nanotubes"; Pending U.S. Appl. No. 14/593,192, filed Jan. 9, 2015; 23 pages.
Hawtof; "Glass Sheet and System and Method for Making Glass Sheet"; Pending U.S. Appl. No. 62/025,627, filed Jul. 17, 2014; 27 pages.
Chinese Patent Application No. 201680019033.8; English Translation of the First Office Action dated Aug. 27, 2019; China Patent Office; 10 Pgs.

\* cited by examiner

SILICA-CONTAINING SHEET AND RELATED SYSTEM AND METHODS

SUMMARY

The disclosure relates generally to formation of silica-containing articles, and specifically to the formation of thin silica-containing sheets via silica soot deposition. Silica soot may be generated by a process, such as flame hydrolysis. The silica soot may then be sintered to form a transparent or partially transparent glass sheet.

One embodiment of the disclosure relates to a system for making a thin silica-containing sheet. The system includes a soot deposition plate having a deposition surface and a glass soot generating device spaced from the deposition surface along a first axis. The glass soot generating device is configured to generate glass soot particles and to deliver the glass soot particles through an outlet and on to the deposition surface in a layer having a thickness of less than 5 mm. The outlet of the glass soot generating device faces the deposition surface of the soot deposition plate. At least one of the soot deposition plate and the glass soot generating device is moveable to cause relative movement between the deposition surface of the soot deposition plate and the glass soot generating device.

An additional embodiment of the disclosure relates to a method of making a thin glass soot sheet. The method includes providing a soot deposition surface and delivering a stream of glass soot particles from a soot generating device to the soot deposition surface. The soot generating device is spaced from the soot deposition surface along a first axis. The method includes generating relative movement between the stream of soot particles and the soot deposition surface such that the stream of soot particles forms a contiguous layer of soot particles on the soot deposition surface. The contiguous layer of soot particles has a thickness less than 5 mm. The relative movement between the stream of soot particles and the soot deposition surface includes movement within a plane perpendicular to the first axis.

An additional embodiment of the disclosure relates to a silica-containing sheet. The silica-containing sheet includes a first major surface, and the first major surface has a variable surface topography. The silica-containing sheet includes a second major surface opposite the first major surface and at least 50 mole % silica. The silica-containing sheet has an average thickness between the first major surface and the second major surface of less than 5 mm, a length of at least 1 cm and a width of at least 1 cm. The variable surface topography of the first major surface varies such that a first surface profile along a first x-axis is different than a second surface profile along a second x-axis and a third surface profile along a first y-axis is different than a fourth surface profile along a second y-axis.

An additional embodiment of the disclosure relates to a silica glass sheet. The silica glass sheet includes a first major surface, and the first major surface has a variable surface topography. The silica glass sheet includes a second major surface opposite the first major surface and at least 50 mole % silica. At least some of the silica is sintered such that the sheet is translucent such that light is permitted to pass through the sheet between the first major surface and the second major surface. The silica glass sheet includes an average thickness between the first major surface and the second major surface of less than 5 mm, a length of at least 1 cm and a width of at least 1 cm. The variable surface topography of the first major surface varies such that a first surface profile along a first x-axis is different than a second surface profile along a second x-axis and a third surface profile along a first y-axis is different than a fourth surface profile along a second y-axis.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a thin silica-containing sheet as well as related systems and methods are shown. As used herein, the silica ($SiO_2$) containing sheet may be a thin sheet formed from deposited silica soot, may also be a thin sheet of silica glass formed by fully sintering the silica soot sheet, and may also be a thin sheet of partially sintered silica soot. In various embodiments, the system and method disclosed herein utilizes one or more glass soot generating device (e.g., a flame hydrolysis burner) that is directed or aimed to deliver a stream of glass soot particles on to a soot deposition plate. The soot deposition plate has deposition surface that faces the soot generating device. In general, the deposition plate is a structure with a non-cylindrical deposition surface that receives glass soot from a soot generating device. In various specific embodiments, the deposition plates include a deposition surface that is a substantially flat or planar surface that faces the soot deposition device.

In various embodiments, the soot deposition plate and glass soot generating device are configured for relative movement between the glass soot generating device and the deposition surface. This relative movement allows the glass soot generating device to sequentially deliver glass soot to various portions of the deposition surface to build up a glass soot sheet on the deposition surface. In contrast to systems that utilize a rotating drum with a cylindrical deposition surface, the present system provides for formation of a silica-containing sheet with variable and/or asymmetric thicknesses and surface profiles and also allows for a silica-containing sheet with different material types or properties at different locations throughout the silica-containing sheet. Such variability may allow for the production of silica-containing sheets with specifically selected thicknesses, surface profiles and material distributions as may be desirable for certain applications.

Figure 1:
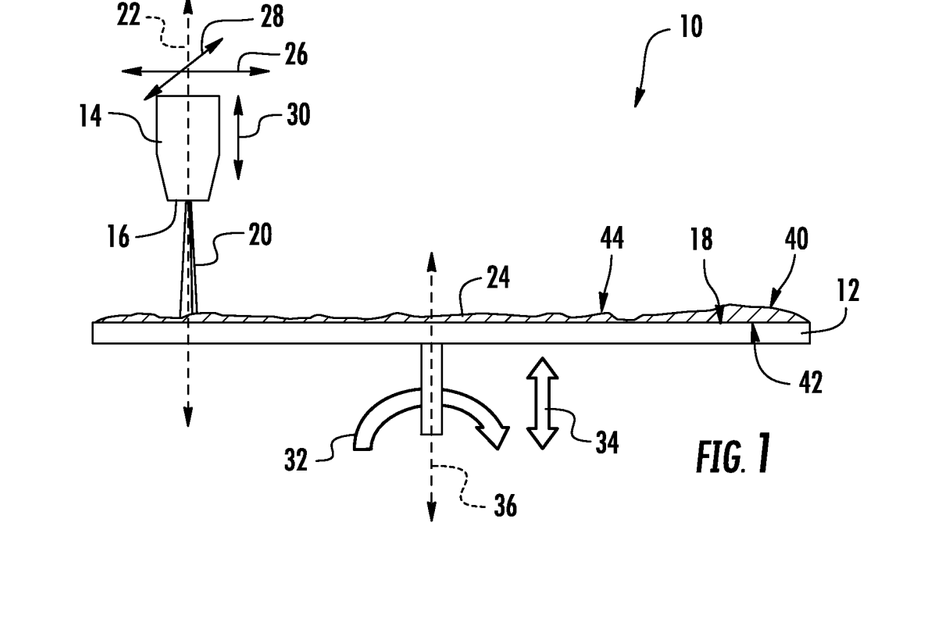
FIG. 1 shows a silica soot deposition system according to an exemplary embodiment.

Referring to FIG. 1, a system for making a thin, silica-containing sheet, shown as system 10, is depicted according to an exemplary embodiment. System 10 includes a soot deposition plate, shown as plate 12, and a glass soot generating device, shown as flame hydrolysis burner 14. As shown, burner 14 has an outlet 16 that faces the deposition surface, shown as upper surface 18, of plate 12. As will be understood, burner 14 is a device that is capable of hydrolyzing a wide range of silica-containing materials and/or other suitable glass formation materials to generate a stream 20 of glass soot particles that is delivered onto upper surface 18. In other embodiments, any suitable soot generating device, such as a plasma-based soot generating devices, may be used instead of or in addition to burner 14.

Operation of a soot generating device, such as burner 14, typically involves chemical reactions between precursor chemicals (e.g., gaseous compounds) to form glass soot particles. Optionally, the chemical reactions can be further assisted by supplemental energy sources such as plasma or a supplemental heating device. Silicon-containing precursor compounds, for example, can be used to form silica soot particles that are deposited on plate 12. An example silicon-containing precursor compound is octamethylcyclotetrasiloxane (OMCTS). OMCTS can be introduced into a burner or burner array together with H2, O2, CH4 or other fuels where it is oxidized and hydrolyzed to produce silica soot particles. In other embodiments, the process and apparatus discussed herein can be used to form soot sheets from other glass soot particles as well.

In various embodiments, burner 14 may use a variety of precursors common to optical fiber manufacturing, including other siloxanes and chlorides. Burner 14 may have flow rates in the range from 5-100 grams/minute with appropriate amounts of accompanying CH4 or H2 with O2 and N2.

As-produced or as-deposited, the soot particles may consist essentially of a single phase (e.g., a single oxide) such as in the example of un-doped, high-purity silica material. Alternatively, the soot particles may comprise two or more components or two or more phases, such as in the example of doped silica soot. For instance, multiphase high-silica sheets can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements. In various embodiments, the silica soot particles may be doped with a variety of materials, including germania, titania, alumina, phosphorous, rare earth elements, metals and fluorine.

Referring back to FIG. 1, burner 14 is spaced from upper surface 18 in a direction along axis 22. In the embodiment shown, burner 14 and plate 12 are positioned relative to each other such that stream 20 is directed substantially parallel with axis 22 (e.g., within plus or minus 10% of exactly parallel to each other) and substantially perpendicular to upper surface 18 (e.g., within plus or minus 10% of exactly perpendicular to each other). Specifically, in the arrangement shown in FIG. 1, upper surface 18 of plate 12 is a substantially planar surface that lies in a substantially horizontal plane, and axis 22 is a vertical axis such that stream 20 is a substantially vertical stream of soot particles.

However, in other embodiments, burner 14 and plate 12 may be arranged in other positions. For example, in one embodiment, plate 12 may be substantially horizontal, and burner 14 may be angled such that stream 20 impacts upper surface 18 at an angle. In another embodiment, plate 12 may be angled such that upper surface 18 is at angle relative to the horizontal axis, and burner 14 is positioned to deliver a substantially vertical soot stream 20. In another embodiment, burner 14 is angled such that stream 20 is at an angle relative to the vertical axis, and plate 12 is angled such that upper surface 18 is at an angle relative to the horizontal axis. FIG. 1 shows burner 14 positioned so that stream 20 is at 90 degrees relative to plate 12. In various embodiments, burner 14 and/or plate 12 are positioned relative to each other such that the relative angle between upper surface 18 of plate 12 and stream 20 is between 30 degrees and 90 degrees, and more specifically between 45 degrees and 90 degrees.

In various embodiments, plate 12 is formed from any material suitable for receiving glass soot particles from a device such as burner 14. In one embodiment, plate 12 is formed from a ceramic material, such as quartz. In some embodiments, the material of plate 12 may include ceramics, metals and/or glass ceramics. In one embodiment, plate 12 is shaped such that upper surface 18 is a flat, smooth planar surface. In various embodiments, upper surface 18 is smooth such that the surface roughness, Ra is between 10 nm and 0.01 nm over a substantial portion (e.g., at least 1 square cm, at least 10 square cm) of surface 18. However, in other embodiments, upper surface 18 may be either a convex or concave surface. In another embodiment, upper surface 18 may include patterning (e.g., series of ridges and depressions, rounded bumps, cross-hatching, etc.), and in such embodiments, the patterning in upper surface 18 creates a complimentary embossed pattern on the lower surface of the deposited soot sheet.

In various embodiments, at least one of plate 12 and burner 14 is movable to generate relative motion between upper surface 18 and burner 14. The relative movement causes stream 20 to be sequentially directed onto different portions of upper surface 18 such that a contiguous silica soot sheet 24 is formed on upper surface 18. As depicted by arrows 26 and 28, in the embodiment shown, burner 14 is configured to translate in two directions perpendicular to separation axis 22 such that burner 14 is able to move to multiple points within a plane perpendicular to separation axis 22. Thus, in this configuration, burner 14 moves relative to upper surface 18 such that stream 20 of glass soot particles is sequentially directed onto to different portions of plate 12 to create soot sheet 24.

Further, as depicted by arrow 30, burner 14 is configured to translate toward and away from plate 12 in a direction parallel to separation axis 22. In various embodiments, movement of burner 14 in the direction of arrow 30 may be desired to decrease or increase the soot density at a particular location on upper surface 18. For example, burner 14 may be moved closer to upper surface 18 if soot density at a particular location is to be increased, and burner 14 may be moved away from upper surface 18 if soot density at a particular location is to be decreased.

In various embodiments, burner 14 can move in the direction of arrow 30 such that the distance between burner outlet 16 and upper surface 18 of plate 12 can vary from 3 inches to 9 inches, and in various embodiments, this distance can be a function of the burner flow rates used. In addition, in various embodiments, the relative movement rate between burner 14 and upper surface 18 can be from 1 mm/sec to 100 mm/sec. In a specific embodiment, burner 14 is configured to translate at speeds from 1 mm/sec to 100 mm/sec, and plate 12 can be a stationary plate, a rotating plate or a translating plate.

In place of or in addition to burner movement, plate 12 may be configured to move relative to burner 14. In the embodiment shown, plate 12 is configured for rotation, as shown by arrow 32, and for movement toward and away from burner 14, as shown by arrow 34. In some embodiments, plate 12 may be configured to translate in the direction of arrows 26 and 28 instead of or in addition to rotation. As shown by arrow 32, plate 12 is configured to rotate about a rotation axis 36, and in the embodiment shown, rotation axis 36 is parallel to separation axis 22 and is also perpendicular to upper surface 18. Thus, similar to the translation of burner 14, rotation of plate 12 in the direction of arrow 32 allows for movement of deposition surface 18 within a plane perpendicular to separation axis 22 which in turn allows soot stream 20 to be sequentially directed toward various sections of upper surface 18 to form soot sheet 24. As used herein, movement within a plane means that the same point on the moving object will translate along a path that resides in a single plane. Translation of burner 14 in the direction of arrows 26 and 28 and rotation of plate 12 in the direction of arrow 32 are examples of movement within a plane.

Similar to burner movement in the direction of arrow 30, movement of plate 12 in the direction of arrow 34 allows for increasing or decreasing soot density within soot sheet 24 by increasing and decreasing the relative separation distance between burner 14 and upper surface 18. In various embodiments, various rotational speeds for plate 12 may be used. For example, rotation speeds for plate 12 may be from 0.001 rotations per second to 10 rotations per second. In a specific embodiment, rotation speeds for plate 12 may be from 0.01 rotations per second to 1 rotation per second, and specifically may be 0.5 rotations per second.

As shown in the embodiment of FIG. 1, in one embodiment, system 10 is configured such that both burner 14 and plate 12 are configured to contribute to the relative movement between the two components of the system. However, in another embodiment, burner 14 is configured for movement and plate 12 is stationary, and in another embodiment, plate 12 is configured for movement and burner 14 is stationary.

As shown in FIG. 1, burner 14 is a point style flame hydrolysis burner configured to generate a relatively narrow stream 20. In various embodiments, stream 20 has a substantially circular or ring shaped stream profile in a plane perpendicular to stream 20. In other embodiments, burner 14 may be a linear flame hydrolysis burner that generates an elongate soot stream that delivers a band or stripe of soot onto upper surface 18.

As noted above, in one embodiment, burner 14 is a silica hydrolysis burner that generates high silica content soot to form soot sheet 24. In various embodiments, soot sheet is at least 50 mole % silica. In another embodiment, soot sheet 24 is at least 90% by weight of silica. In various embodiments, soot sheet may include a variety of additional materials to provide sheet 24 or a sintered sheet formed from sheet 24 with different properties as desired. For example, sheet 24 may include a variety of silica dopant materials delivered from burner 14. In other embodiments, burner 14 may be controlled to deliver soot particles of varying silica content at different positions along plate 12.

As shown in FIG. 1, soot sheet 24 is a relatively thin, contiguous sheet of deposited glass soot material that is built up by the sequential deposition of soot particles from burner 14. In one embodiment, soot sheet 24 has a maximum thickness less than 5 mm, and in another embodiment, soot sheet 24 has a maximum thickness less than 1 mm and more specifically less than 500 microns. In various embodiments, the size of plate 12 and upper surface 18 may be varied to produce glass soot sheets having various lengths and widths as may be desired for particular applications. In various embodiments, the length and width of soot sheet 24 is between 1 mm and 10 m. In a specific embodiment, soot sheet 24 has a length of at least 1 cm and a width of at least 1 cm.

As shown in FIG. 1, soot sheet includes a first major surface, shown as upper surface 40, and a second major surface, shown as lower surface 42. In the arrangement shown, lower surface 42 opposes upper surface 40 and is in contact with upper surface 18 of plate 12. Surface 40 has a variable surface topography 44. As described in more detail below, in various embodiments, surface topography 44 is asymmetrical along at least two axes perpendicular to separation axis 22. Further, FIG. 1 shows soot sheet 24 as having a single layer of deposited soot. However, in other embodiments, system 10 may be configured such that soot stream 20 is directed over previously deposited soot such that multilayer soot sheets may be formed. It should be understood, because of the raster-type relative movement between plate 12 and burner 14, system 10 allows for the creation of multi-layered soot sheets in which non-parallel layers may be created.

In various embodiments, once deposition of soot sheet 24 is completed, soot sheet 24 may be removed and used as is without sintering. However, in another embodiment, soot sheet 24 is partially or completely sintered to form a thin, high-silica content glass sheet. In one embodiment, soot sheet 24 is sintered (e.g., via laser or heat sintering) in place on plate 12.

Figure 2:
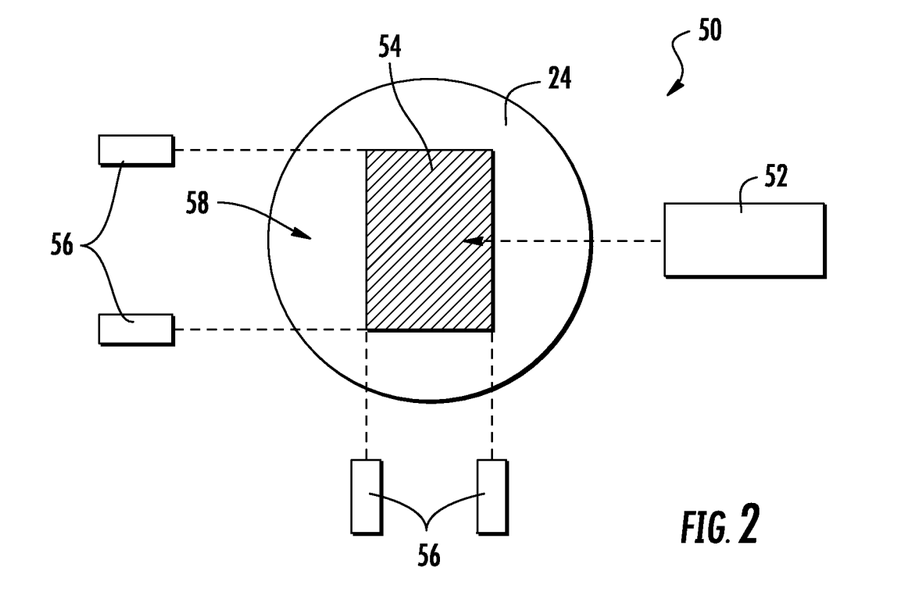
FIG. 2 shows a sintering station according to an exemplary embodiment.

In various embodiments, relative movement between burner 14 and deposition surface 18 is stopped and burner 14 is turned off, and then soot sheet 24 is lifted or released from plate 12 and moved to a sintering station 50, as shown in FIG. 2. In various embodiments, a releasing device, such as an air jet or a soot sheet cooling device, may be used to separate soot sheet 24 from plate 12. Once separated, the edges of soot sheet 24 are supported and soot sheet 24 is moved to sintering station 50.

A schematic view of sintering station 50 is shown in FIG. 2 according to exemplary embodiment. As shown in FIG. 2, sintering station 50 includes a sintering device, shown as sintering laser 52. Sintering laser 52 directs laser energy onto at least a portion of soot sheet 24 causing the soot particles hit with the laser to reorganize or densify, forming glass section 54, which is composed of at least partially sintered silica particles or fully sintered silica. In various embodiments, laser 52 may be a wide variety of suitable sintering lasers, including CO2 lasers, greater than 100 Watt laser, greater than 200 W laser, less than 2000 W laser, etc. In other embodiments, other sintering devices, such as heat sintering devices may be used instead of or in addition to laser 52. In various embodiments, laser 52 is used in conjunction with a lens that expends the laser beam into a line or rectangular shape, and in such embodiments, the lens is between the laser and the soot sheet.

As will be generally understood, sintered section 54 will include the same silica (and other component) content as soot sheet 24. However, the material of soot sheet 24 has been reorganized by the sintering process to form a transparent/translucent glass sheet. Typically during this process the silica material reorganizes into a form of silica having a density higher than that of silica soot sheet 24. For example, in some embodiments, soot sheet 24 is fully sintered from a low density soot sheet (e.g., 0.5 g/cm3, between 0.4 g/cm3 and 0.7 g/cm3) to a fully sintered section 54, such as having a density greater than 1.0 g/cm3, such as greater than 1.5 g/cm3, such as greater than 2.0 g/cm3 (e.g., 2.2 g/cm3) or more. In some embodiments, fully sintered section 54 formed by laser sintering have transmittance of ultraviolet, visible, and/or near infrared light that is greater than 90%, such as greater than 92%, such as greater than 93% for a sintered thickness of 0.1 mm. In another embodiment, soot sheet 24 may include pressed silica soot particles instead of or in addition to deposited silica soot particles.

In other embodiments, sintered section 54 is partially sintered from soot sheet 24 such that the sintered section 54 has a density greater than 0.5 g/cm3 and/or less than 2.2 g/cm3. Partially sintered section 54 may hold together better than unsintered sheets, such as being able to be rolled on a spool. In contemplated embodiments, unsintered soot sheets or partially sintered soot sheets, of materials as described herein, may be used as end products, such as serving as substrates, layers, barriers, etc., such as to aid with carbon nanotubes or for other purposes.

Following sintering to form glass section 54, glass section 54 may be removed from the remaining unsintered portions of soot sheet 24 surrounding glass section 54. In one embodiment, sintering station 50 includes one or more trimming device, shown as trimming lasers 56. In general, lasers 56 cut glass section 54 from the remaining surrounding border of unsintered soot sheet portion 58. In another embodiment, glass section 54 may be left located within the surrounding unsintered soot sheet portion 58, and in this embodiment, the silica-containing sheet includes both sintered glass section 54 and unsintered soot sheet portion 58.

Figure 3:
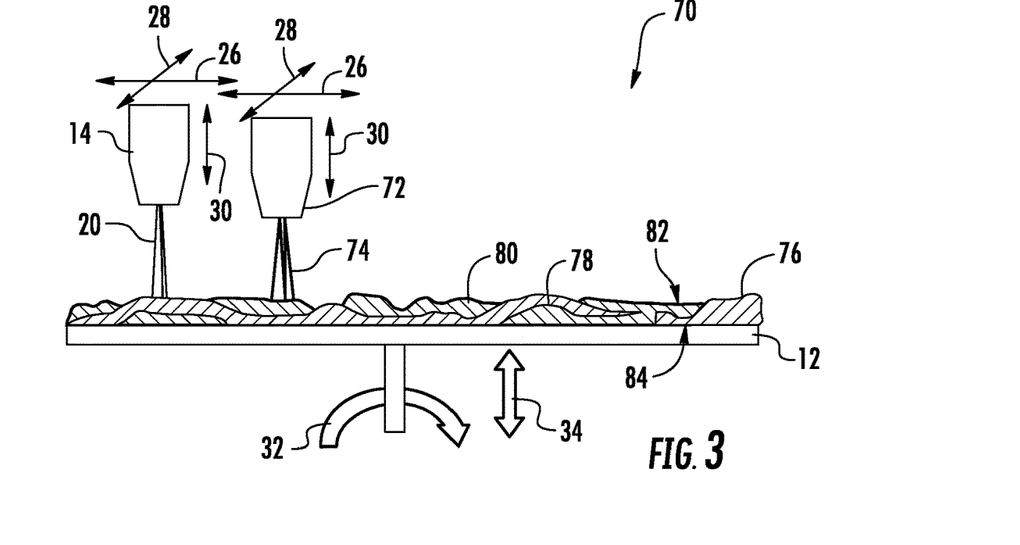
FIG. 3 shows a silica soot deposition system according to another exemplary embodiment.
Figure 4:
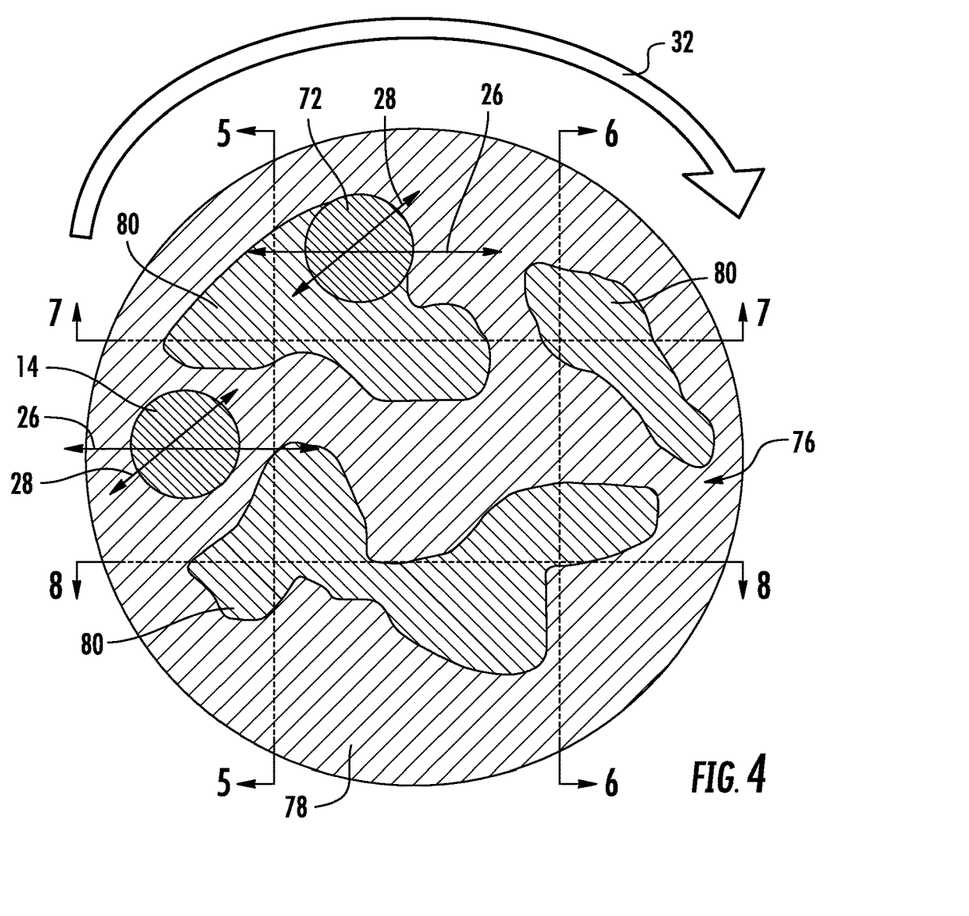
FIG. 4 shows a top view of the silica soot deposition system of FIG. 3 according to an exemplary embodiment.

Referring to FIG. 3 and FIG. 4, another system for making a thin, silica-containing sheet, shown as system 70, is depicted according to an exemplary embodiment. System 70 is substantially the same as system 10 except as discussed herein. System 70 includes at least one additional soot depositing device, shown as additional flame hydrolysis burner 72. It should be understood that while FIG. 3 shows a single additional burner 72, system 70 can include multiple additional burners 72.

During operation of system 70, burner 14 generates soot stream 20, as discussed above, and burner 72 generates an additional soot stream 74, and together burners 14 and 72 direct soot streams 20 and 74, respectively, onto plate 12 to deposit soot particles to form soot sheet 76. As shown in FIG. 3 and FIG. 4, soot sheet 76 includes at least two layers of deposited silica soot particles. In various embodiments, layer 78 is formed from soot particles generated by burner 14, and layer 80 is formed from soot particles generated by additional burner 72.

As shown in FIG. 3 and FIG. 4, layers 78 and 80 form a relatively irregular and asymmetrical pattern. For example, layers 78 and 80 are not coplanar with each other and are not parallel with each other. The pattern of layers 78 and 80 are formed as a result of the movement between burners 14 and 72 and plate 12. In various embodiments, layers 78 and 80 may be formed in particular positions as desired for particular applications.

Further, in contrast to soot deposition systems in which the deposition surface is the outer cylindrical surface of a rotating drum, in various embodiments disclosed herein, a substantial portion of upper surface 18 of plate 12 is covered with a soot sheet, such as soot sheet 76. In the embodiment shown in FIG. 4, substantially the entire upper surface 18 of plate 12 is covered with soot sheet 76 prior to removal from plate 12. In various embodiments, at least 40% and more specifically at least 50% of upper surface 18 of plate 12 is coated with soot sheet 76 prior to removal.

Figure 5:
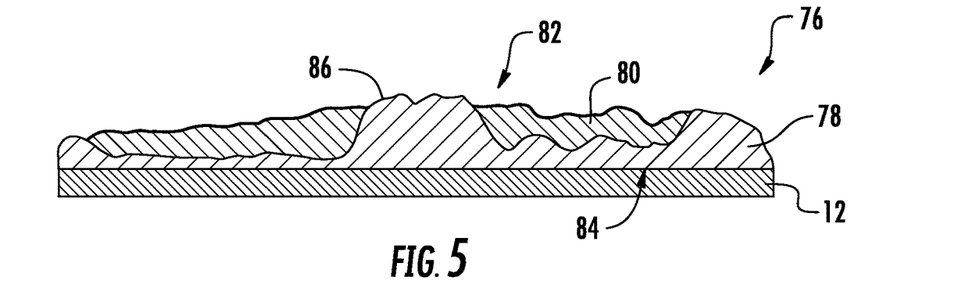
FIG. 5 is a cross-sectional view of a silica soot sheet taken along line 5-5 in FIG. 4 according to an exemplary embodiment.
Figure 6:
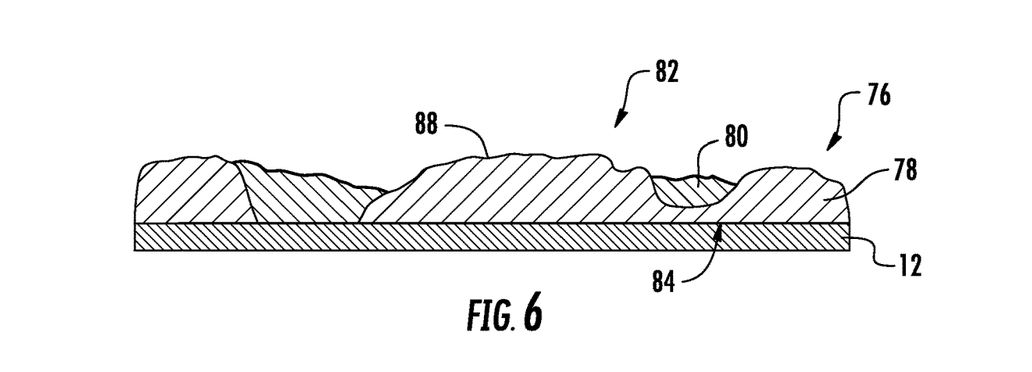
FIG. 6 is a cross-sectional view of a silica soot sheet taken along line 6-6 in FIG. 4 according to an exemplary embodiment.

Referring to FIGS. 4-8, similar to soot sheet 24, soot sheet 76 includes an upper surface 82 and a lower surface 84, and upper surface 82 includes a variable surface topography. FIGS. 5-8 are side cross-section views that depict the variable topography of upper surface 82. FIG. 5 shows a cross-section through soot sheet 76 taken along a first y-axis, and FIG. 6 shows a cross-section through soot sheet 76 taken along a second y-axis. The section of soot sheet 76 shown in FIG. 5 has a first surface profile 86, which is the profile of upper surface 82 at the location of the first y-axis. The section of soot sheet 76 shown in FIG. 6 has a second surface profile 88, which is the profile of upper surface 82 at the location of the second y-axis. As can be seen by a comparison of FIG. 5 and FIG. 6, second surface profile 88 is different from first surface profile 86.

Figure 7:
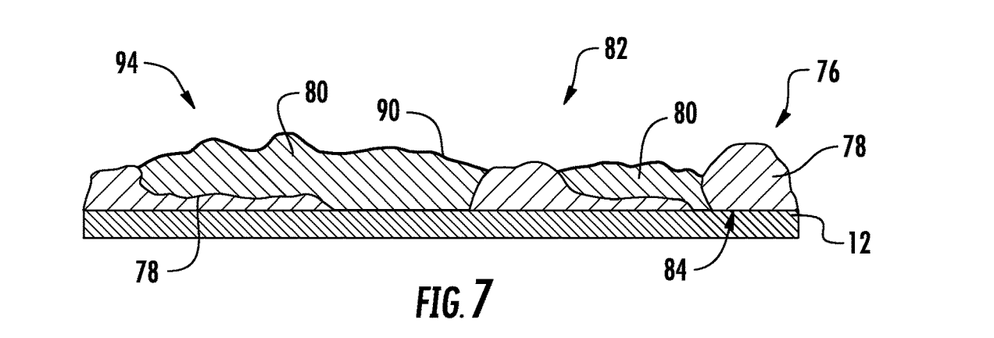
FIG. 7 is a cross-sectional view of a silica soot sheet taken along line 7-7 in FIG. 4 according to an exemplary embodiment.
Figure 8:
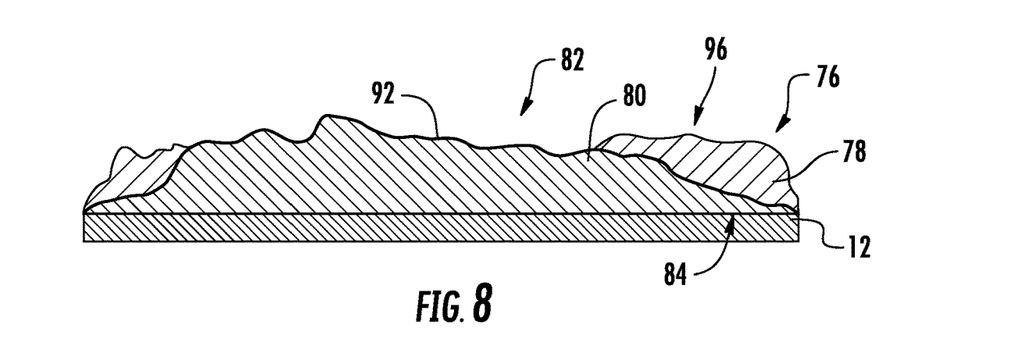
FIG. 8 is a cross-sectional view of a silica soot sheet taken along line 8-8 in FIG. 4 according to an exemplary embodiment.

FIG. 7 shows a cross-section through soot sheet 76 taken along a first x-axis, and FIG. 8 shows a cross-section through soot sheet 76 taken along a second x-axis. The section of soot sheet 76 shown in FIG. 7 has a third surface profile 90, which is the profile of upper surface 82 at the location of the first x-axis. The section of soot sheet 76 shown in FIG. 8 has a fourth surface profile 92, which is the profile of upper surface 82 at the location of the second x-axis. As can be seen by a comparison of FIG. 7 and FIG. 8, third surface profile 90 is different from fourth surface profile 92.

In various embodiments, the degree to which profiles 86, 88, 90 and 92 differ from each other can be quantified or defined in different ways. In one embodiment, profile 86 differs from profile 88 such that the distance between the position of the maximum (e.g., the point of greatest thickness of soot sheet 76) of profile 86 and the position of the maximum of profile 88 as measured in the direction the y-axis is greater than 10 micrometers. Similarly, in one embodiment, profile 90 differs from profile 92 such that the distance between the position of the maximum of profile 90 and the position of the maximum of profile 92 as measured in the direction the x-axis is greater than 10 micrometers.

As shown by a comparison of FIGS. 5-8, in one embodiment, all surface profiles 86, 88, 90 and 92 are different from each other. In one specific embodiment, the topography of upper surface of 82 is random and nonrepeating, such that upper surface 82 defines different profiles taken along all x and y axes.

Referring specifically to FIG. 7 and FIG. 8, the multiple burner and deposition plate arrangement may allow for other layering arrangements that may be difficult or impossible to form with prior soot deposition systems. In particular, as shown in FIG. 7 and FIG. 8, the independent movement of burners 14 and 72 allows for layers 78 and 80 to be deposited in varying strata at different positions along plate 12. Thus, as an example, at area 94 of soot sheet 76 shown in FIG. 7, layer 80 is located above layer 78, and at area 96 of soot sheet 76 shown in FIG. 8, layer 78 is shown located above layer 80. In various embodiments, the positioning of different layers of soot sheet 76 and/or the variable surface topography may be formed by controlling the movement of burners 14 and 72. In another embodiment, variability within soot sheet 76 may be formed by controlling soot generation of burners 14 and 72. For example in one embodiment, burners 14 and 72 may be controlled to turn on and off in order to form layers 78 and 80 at various desired areas of plate 12. In other embodiments, burners 14 and 72 may be controlled such that the amount of soot particles produced is varied at different portions along plate 12. In one specific embodiment, this control may be achieved by varying the gas supply flow rates into burners 14 and 72.

Further, in addition to allowing for different physical arrangements and structures of soot layers within soot sheet 76, system 70 also allows for forming a soot sheet with different silica soot materials. In such an embodiment, a first silica material may be generated from burner 14, and a different, second silica material may be generated from burner 72. In one embodiment, the first silica material of burner 14 may generate soot particles having a silica content and/or dopant material that is different from the silica content and/or dopant material of the second silica material generated by burner 72. In such embodiments, soot sheet 76 (and a sintered glass sheet formed from soot sheet 76) may have different properties at different regions of the soot sheet based on the material content at a particular location. In various embodiments, silica content of layers 78 and 80 may range between 50 mole % and 99.9 mole %, specifically between 90 mole % and 99.9 mole % and more specifically between 99 mole % and 99.999 mole %. In various embodiments, layers 78 and 80 may have one or more dopant material including any dopant materials discussed herein.

Figure 9:
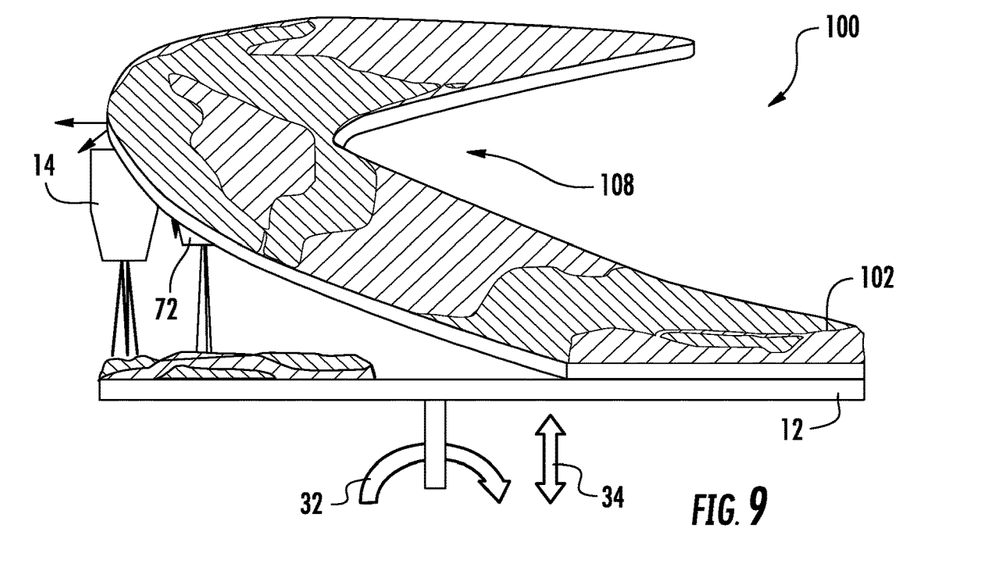
FIG. 9 shows a silica soot deposition system according to another exemplary embodiment.
Figure 10:
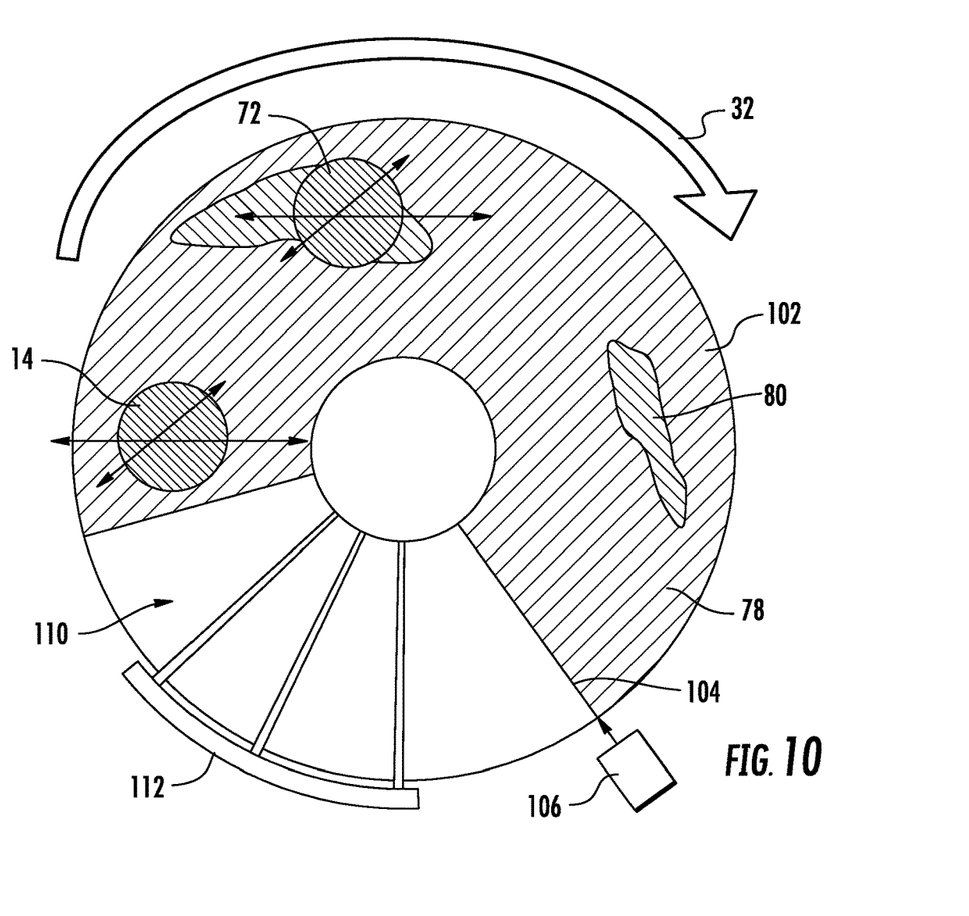
FIG. 10 shows a top view of the silica soot deposition system of FIG. 9 according to an exemplary embodiment.

Referring to FIG. 9 and FIG. 10, another system for making a thin silica-containing sheet, shown as system 100, is depicted according to an exemplary embodiment. System 100 is substantially the same as system 70 except as discussed herein. System 100 is configured to generate a contiguous soot sheet 102 on a rotating plate 12 and to continuously lift soot sheet 102 from plate 12 as plate 12 is rotating. Soot sheet 102 is substantially the same as soot sheet 76 except that soot sheet is a continuous soot sheet that can be formed having very long length due to the continuous nature of the soot sheet formation provided by system 100.

In the embodiment of FIG. 9 and FIG. 10, burners 14 and 72 deposit soot layers onto plate 12 as plate 12 spins, and as a leading edge 104 of soot sheet 102 encounters a removal device 106 (e.g., an air jet), soot sheet is separated from plate 12. Once separated from plate 12, the continuous soot sheet 102 is supported and transferred to a sintering station, such as sintering station 50 discussed above, for further processing. In some embodiments, the portion of soot sheet 102 removed from plate 12 may include a coiled section 108 (shown in FIG. 9) that results from shape and rotation of plate 12.

As shown in FIG. 10, with the clockwise rotation shown by arrow 32, the region of plate 12, shown as region 110, between removal device 106 and burner 14, is substantially free of deposited soot due to the removal of soot sheet 102 at removal device 106. In one embodiment, system 100 may have a cleaning device 112 that cleans region 110 prior to receiving more deposited soot as plate 12 passes under burners 14 and 72.

Figure 11:
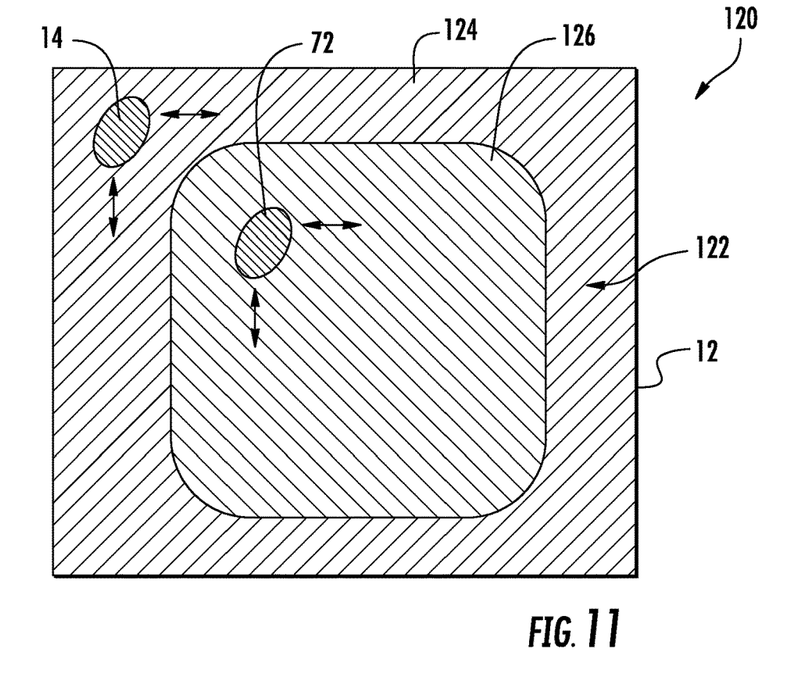
FIG. 11 shows a silica soot deposition system according to another exemplary embodiment.

Referring to FIG. 11, another system for making a thin silica-containing sheet, shown as system 120, is depicted according to an exemplary embodiment. System 120 is substantially the same as system 70 except as discussed herein. In particular, system 120 shows plate 12 as having a rectangular upper surface, rather than the circular shaped upper surface 18 shown above. In various embodiments, plate 12 can have any of a wide variety of shaped deposition surfaces in order to form soot sheets of the desired shape. For example, the deposition surface of plate 12 can be circular, square, rectangular, triangular, etc.

Further, while the systems 10, 70 and 100 relate primarily to systems that form variable and asymmetric soot sheets, system 120 is configured to form a soot sheet 122 having a regular or symmetric deposition pattern. In this embodiment, burner 14 deposits an outer soot area 124 that surrounds an inner soot area 126 deposited by burner 72. In various embodiments, burners 14 and 72 may be controlled such that the silica material in outer soot area 124 is different from the silica material of inner soot area 126. For example, the silica content and/or dopant material in outer soot area 124 may be different from the silica content and/or dopant material in inner soot area 126. In other embodiments, physical properties, such as surface profile, soot density, soot thickness, etc. may be varied between outer soot area 124 and inner soot area 126.

Figure 12:
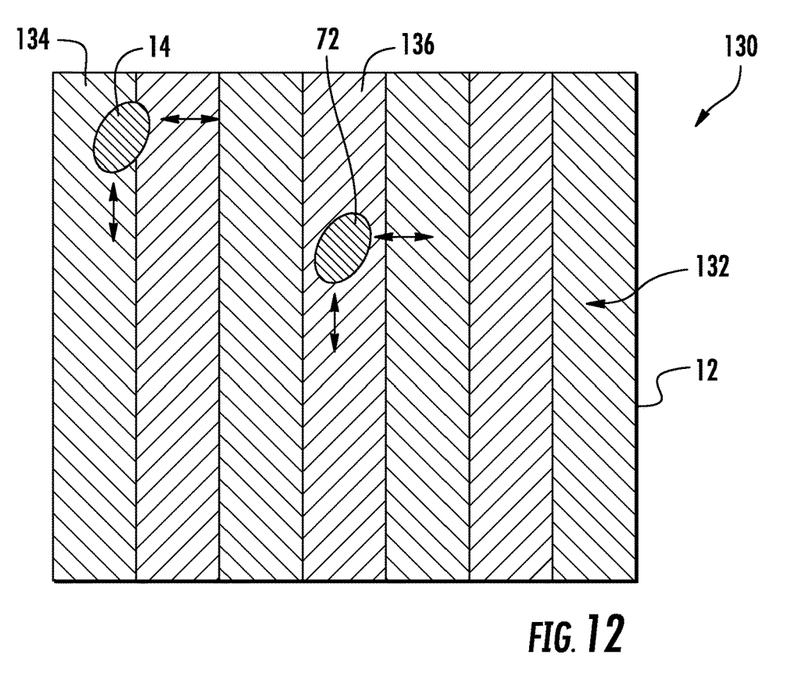
FIG. 12 shows a silica soot deposition system according to another exemplary embodiment.

Referring to FIG. 12, another system for making a thin silica-containing sheet, shown as system 130, is depicted according to an exemplary embodiment. System 130 is similar to system 120 except as discussed herein. Like system 120, system 130 is configured to form a soot sheet 122 having a regular or symmetric deposition pattern. In this embodiment, burner 14 deposits soot areas 134 that alternate with soot areas 136 deposited by burner 72. In various embodiments, burners 14 and 72 may be controlled such that the silica material in soot area 134 is different from the silica material of soot area 136. For example, the silica content and/or dopant material in soot area 134 may be different than the silica content and/or dopant material in soot areas 316. In other embodiments, physical properties, such as surface profile, soot density, soot thickness, etc. may be varied between soot areas 134 and soot areas 136.

Figure 13:
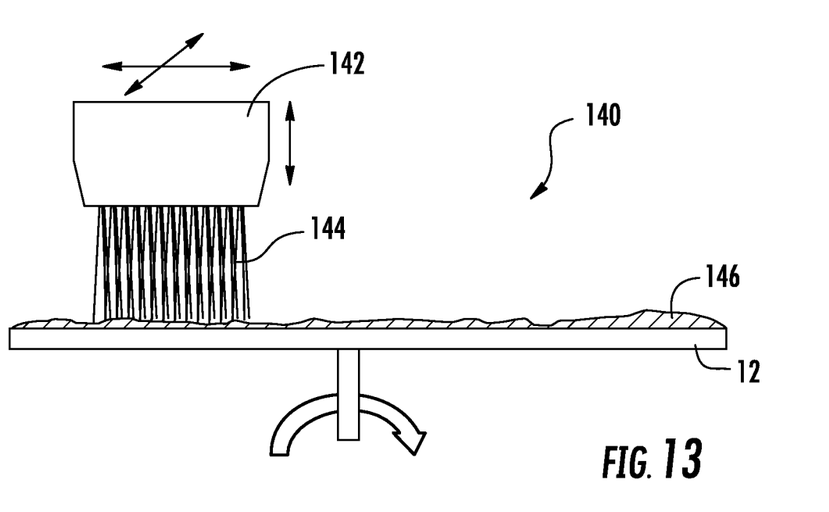
FIG. 13 shows a silica soot deposition system according to another exemplary embodiment.

Referring to FIG. 13, another system for making a thin silica-containing sheet, shown as system 140, is depicted according to an exemplary embodiment. System 140 is substantially the same as system 10 except as discussed herein. System 140 utilizes one or more linear-style flame hydrolysis burners 142 in place of burner 14. Linear burner 142 generates an elongate and asymmetrical stream 144 of silica soot particles that are deposited on plate 12 to form soot sheet 146. In one embodiment, linear burner 142 includes multiple outlets spaced along the burner and generates multiple soot streams that combine to form stream 144. Soot sheet 146 is similar to the soot sheets described above except that the surface topography of upper surface 148 tends to be smoother due to the elongate shape of soot stream 144.

The present disclosure also relates to a method of forming a thin, silica-containing sheet, such as any of the sheets discussed herein. According to various embodiments, a method of making a thin glass soot sheet is provided. The method includes providing a soot deposition surface and delivering a stream of glass soot particles from a soot generating device to the soot deposition surface. The soot generating device is spaced from the soot deposition surface along a first axis. The method includes generating relative movement between the stream of soot particles and the soot deposition surface such that the stream of soot particles forms a contiguous layer of soot particles on the soot deposition surface. The contiguous layer of soot particles has a thickness less than 5 mm. In one embodiment of the method, the relative movement between the stream of soot particles and the soot deposition surface includes movement within a plane perpendicular to the first axis.

In various embodiments, the step of generating relative movement includes at least one of translating the soot generating device in at least one direction perpendicular to the first axis, translating the soot deposition surface in at least one direction perpendicular to the first axis, and rotating the soot deposition surface about a second axis that is perpendicular to the soot deposition surface. In some embodiments, the step of generating relative movement includes spinning the soot deposition surface about a second axis, and the method includes removing the contiguous layer of soot particles by lifting a leading edge of the contiguous layer of soot particles from the soot deposition surface while the soot deposition surface is spinning such that the contiguous soot layer is removed in a contiguous sheet.

In various embodiments, the method includes removing the contiguous layer of soot particles from the soot deposition surface after stopping relative movement between the stream of soot particles and the soot deposition surface. In various embodiments, the method includes removing the contiguous layer of soot particles from the soot deposition surface, and in some such embodiments, at least 40% of the soot deposition surface is covered by the contiguous layer of soot particles prior to the removing. In various embodiments, the method includes removing the contiguous layer of soot particles from the soot deposition surface, and sintering the contiguous layer of soot particles to form a silica sheet including at least some sintered silica particles. In various embodiments, any of the systems, devices, etc. disclosed herein, such as systems 10, 70, 100, 120, 130 140, and sintering station 50, may be operated to perform the methods disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A silica-containing sheet comprising:
    a first major surface, the first major surface having a variable surface topography;
    a second major surface opposite the first major surface;
    at least 50 mole % silica;
    an average thickness between the first major surface and the second major surface of less than 5 mm;
    a length of at least 1 cm and a width of at least 1 cm;
    wherein the variable surface topography of the first major surface varies having at least two layers that are not coplanar with each other such that:
        a first surface profile along a first x-axis is different than a second surface profile along a second x-axis; and
        a third surface profile along a first y-axis is different than a fourth surface profile along a second y-axis.

2. The silica-containing sheet of claim 1 wherein the difference between the first and second profiles is such that a distance in the direction of the x-axis between the maximum of the first surface profile and the maximum of the second surface profile is at least 10 micrometers, and wherein the difference between the third and fourth surface profiles is such that a distance in the direction of the y-axis between the maximum of the third surface profile and the maximum of the fourth surface profile is at least 10 micrometers.

3. The silica-containing sheet of claim 1 wherein the sheet is one of a sheet formed from non-sintered silica soot particles, a glass sheet formed from at least partially sintered silica soot particles and a sheet formed from a combination of both non-sintered silica soot particles and from at least partially sintered silica soot particles.

4. The silica-containing sheet of claim 1 including a first layer of a first silica material and a second layer of a second silica material, wherein, at one area of the sheet, the first layer is below the second layer in cross-section, and at another area of the sheet, the second layer is below the first layer in cross-section, wherein the first silica material is different from the second silica material.

5. The silica-containing sheet of claim 4 wherein the first silica material includes at least one of a dopant and a silica content, wherein at least one of the dopant and silica content of the first silica material is different from a dopant and silica content of the second layer.

6. The silica-containing sheet of claim 1, wherein the layers form an irregular and asymmetrical pattern.

7. The silica-containing sheet of claim 1, wherein the layers are not parallel with each other.

8. The silica-containing sheet of claim 1, wherein the layers differ in silica content and/or dopant material.

9. A silica glass sheet comprising;
    a first major surface, the first major surface having a variable surface topography;
    a second major surface opposite the first major surface;

at least 50 mole % silica, wherein at least some of the silica is sintered such that the sheet is translucent such that light is permitted to pass through the sheet between the first major surface and the second major surface;

an average thickness between the first major surface and the second major surface of less than 5 mm;

a length of at least 1 cm and a width of at least 1 cm:

wherein the variable surface topography of the first major surface varies such that:

a first surface profile along a first x-axis is different than a second surface profile along a second x-axis; and a third surface profile along a first y-axis is different than a fourth surface profile along a second y-axis;

wherein the sheet includes a coiled section turning about a minor surface of the sheet.

* * * * *

UNITED STATES PATENT AND TRADEMARK OFFICE
CERTIFICATE OF CORRECTION

PATENT NO. : 10,570,048 B2
APPLICATION NO. : 14/621881
DATED : February 25, 2020
INVENTOR(S) : Daniel Warren Hawtof et al.

Page 1 of 1

It is certified that error appears in the above-identified patent and that said Letters Patent is hereby corrected as shown below:

In the Claims

In Column 12, Line 64, Claim 9, delete "comprising;" and insert -- comprising: --, therefor.

Signed and Sealed this
Twenty-third Day of June, 2020

Andrei Iancu
*Director of the United States Patent and Trademark Office*